United States Patent [19]

McBrien et al.

[11] Patent Number: 5,328,648
[45] Date of Patent: Jul. 12, 1994

[54] METHOD OF USING A COMPOSITE JOINT INFILL SYSTEM

[75] Inventors: James H. McBrien, Houston; Richard L. Wyke, Missouri City; David C. Dressel, Friendswood, all of Tex.

[73] Assignee: Foam Enterprises, Inc., Minneapolis, Minn.

[21] Appl. No.: 744,882

[22] Filed: Aug. 14, 1991

[51] Int. Cl.$^5$ .................. B29C 67/22; B29C 65/00
[52] U.S. Cl. .................. 264/35; 264/45.3; 264/46.5; 264/46.9; 264/109; 264/261; 264/338; 156/304.2
[58] Field of Search .............. 156/304.2; 264/35, 36, 264/46.6, 46.5, 46.9, 46.7, 109, 261, 263, 338, 45.3

[56] References Cited

U.S. PATENT DOCUMENTS

| | | | |
|---|---|---|---|
| 3,954,274 | 5/1976 | Grandlic et al. | 264/46.6 |
| 4,040,165 | 8/1977 | Miessler et al. | 264/109 |
| 4,222,804 | 9/1980 | Short | 156/304.2 |
| 4,338,153 | 7/1982 | Zimmerman | 156/304.3 |
| 4,459,251 | 7/1984 | Eldridge et al. | 264/46.7 |
| 4,630,846 | 12/1986 | Nishino et al. | 156/304.2 |

*Primary Examiner*—Allan R. Kuhns
*Attorney, Agent, or Firm*—Ned L. Conley

[57] ABSTRACT

A pair of concrete coated pipe joints welded together end to end with a gap between the concrete coatings, the gap being filled with a fast setting elastomeric polymeric infill material, either solid or foamed, and a particulate filler material, and a method for molding the infill material with the mold being filled with filler material before the polymer components are injected, and with a membrane lining the mold to prevent the polymer from adhering to the mold.

7 Claims, 2 Drawing Sheets

METHOD OF USING A COMPOSITE JOINT INFILL SYSTEM

This invention relates to a means and a method for infilling the space at a welded joint in a concrete coated pipeline between the ends of the concrete coatings on sequential joints of pipe.

BACKGROUND OF THE INVENTION

Offshore pipelines are commonly laid from a continuously moving vessel known as a lay barge. The separate lengths of pipe in the pipeline may be welded together on shore and then coiled on a reel and placed on a lay barge for the pipe laying operation. Alternatively, lengths of the pipe may be placed on the lay barge and welded together on the barge just prior to laying the pipeline. In either case, to lay the pipeline one end of the line is passed over rollers and then down an elongate cradle or "stinger" which extends rearwardly and downwardly from the stern of the lay barge to the bed of the body of water. As the barge moves forward, the forward motion of the barge causes the pipeline to be pulled along the rollers and down the stinger and thereby continuously laid on the bed of the body of water.

Pipelines larger than about 12 inches in diameter are commonly coated with a thick layer of concrete to weight the pipeline down in the water. Such concrete coatings are applied to individual lengths of the pipe with the coating extending the full length of the pipe except for several inches near each end. Prior to applying the concrete coating, the pipe lengths are usually coated with a material, such as epoxy, to protect the pipe from corrosion. This coating material is also terminated several inches from each end. Successive lengths of pipe are joined together by welding, leaving a gap in the coating material and in the concrete covering at each joint. It is the usual practice to apply a coating to the pipe in this gap to protect the pipe against corrosion, for example with a hot fusion bonded epoxy and/or a shrink sleeve, and to fill the gap between the ends of the concrete coatings so as to provide a smooth, uninterrupted covering for the pipeline. The pipeline can then move smoothly over the rollers and down the stinger to the sea bed.

The gaps are filled with various materials by various techniques. One procedure is to place a metal sleeve or mold over the gap and fill the sleeve with molten mastic which solidifies as it cools. However, in most cases the pipeline must be in a condition for handling immediately after the gaps are filled, so that the laying of the pipeline can proceed without delays. The mastic filling does not set to a sufficiently strong material within the required time to allow further processing of the pipe without additional reinforcement to protect the mastic. Therefore, in conventional filling operations where mastic is used, the sleeve is left in place, so that it remains on the pipe on the ocean floor. This is objectionable, since the sleeve can snag fishnets, and cause other damage to marine operations. Moreover, the filling of the gaps with mastic in this way is highly labor intensive, and therefore expensive.

A more effective method is to fill the gap with a fast cure material inside a removable, preferably reusable, mold which is removed before the pipe is advanced into the water. Various polymer concretes, such as those disclosed in U.S. Pat. No. 4,608,208, or polyurethanes have been used in this way. The removable mold surface is coated with a release agent to prevent the fast cure material from sticking to the mold surface. Such a mold release adds expense and processing time, and is inefficient if improperly applied. Furthermore, some of the release material remains on the surface of the fast cure material and enters the water with the pipe as a potential environmental contaminant.

SUMMARY OF THE INVENTION

According to the present invention the gap between the concrete coatings on successive pipe lengths is filled by molding in place a fast setting elastomeric polyurethane or polyurea, either foamed or solid, which includes a uniformly dispersed filler material. Such a joint infill has excellent adhesive properties, bonding directly to most dry materials and substrates, and can be applied directly over hot fusion bonded epoxy or a shrink sleeve with little or no effect on corrosion protection. Once solidified, the material becomes an environmentally and chemically neutral, stable high strength product. Within five minutes of casting, the pipe with the infill of this invention can be pulled over guide rollers and down a stinger or across a beach or ocean bottom.

In molding the joint infill of this invention, an expendable, or reusable, sheet or clam type mold can be used, depending on the particular material selected. Preferably, a reusable metal clam type mold is used, with a low cost, bio-degradable membrane, such as a sheet of cardboard, used to prevent the polymeric material from contacting and adhering to the mold, to allow easy separation of the mold from the molded product.

The mold is first filled with the filler material, and the unreacted components of the polyurea or polyurethane are fed into the mold through a tube inserted into the top of the mold and extending into the bottom of the mold cavity. As the unreacted materials flow into the mold cavity, the tube is slowly withdrawn so that it will not be caught in the solidifying polymer, with flow of the unreacted polymer components continuing until the filler material is fully saturated and the mold is filled. The low viscosity of the mixture of unreacted polymer components allows it to fully eliminate all voids by filling the interstices between the filler material particles.

When a solid joint infill material is to be molded, the mold may consist of merely a sheet of polyethylene or polypropylene wrapped around the gap and overlapping the ends of the concrete, with the ends of the sheet not quite reaching each other at the top of the gap. This sheet is then secured in place by clamps wrapped around it over the enclosed ends of the concrete. A polymer filler tube is inserted into the opening at the top of the mold, and run to the bottom of the mold. The filler material is poured in until the mold is filled, and the mixed components of the polymer are then injected through the tube to fill the mold, including the interstices between the particles of filler material, from the bottom up, with the filler tube being withdrawn as the mold is filled. When the mold is filled, the flow of polymer components is stopped, and the polymer is allowed to set up. In from two to five minutes, the mold sheet may be removed, and the pipe is ready to handle.

When a foamed polymer is used, it is preferred to use a steel mold so that pressure can be held on the polymer during the foaming and setting of the material. This mold is preferably lined with a membrane to protect the mold from the polymer, so that the mold can be easily removed after the molding is finished. A preferred membrane is cardboard, which will adhere to the polymer, but will prevent the polymer from adhering to the mold. The mold is filled in the same way, but when filling is completed, the opening at the top is clamped shut to hold the material under pressure until it sets up.

It is therefore an object of this invention to produce a joint infill system superior to those previously available in resistance to injury, and which is relatively inexpensive.

A further object of this invention is to produce such a joint infill system which can be molded in place and will set up in a short time so that the pipeline can be handled almost immediately.

Still another object is to provide a method for forming an infill for pipe joints which allows the use of a reusable mold which is easily removed from the molded infill and which does not require a release agent which may contaminate the environment.

Another object of the invention is to provide a superior mold protecting membrane which can be left on the molded joint infill, and will allow the mold to be reused.

The accomplishment of these and other objects of the invention will become apparent from the following description of the preferred embodiments of the invention.

DESCRIPTION OF THE PREFERRED EMBODIMENTS

Figure 1:
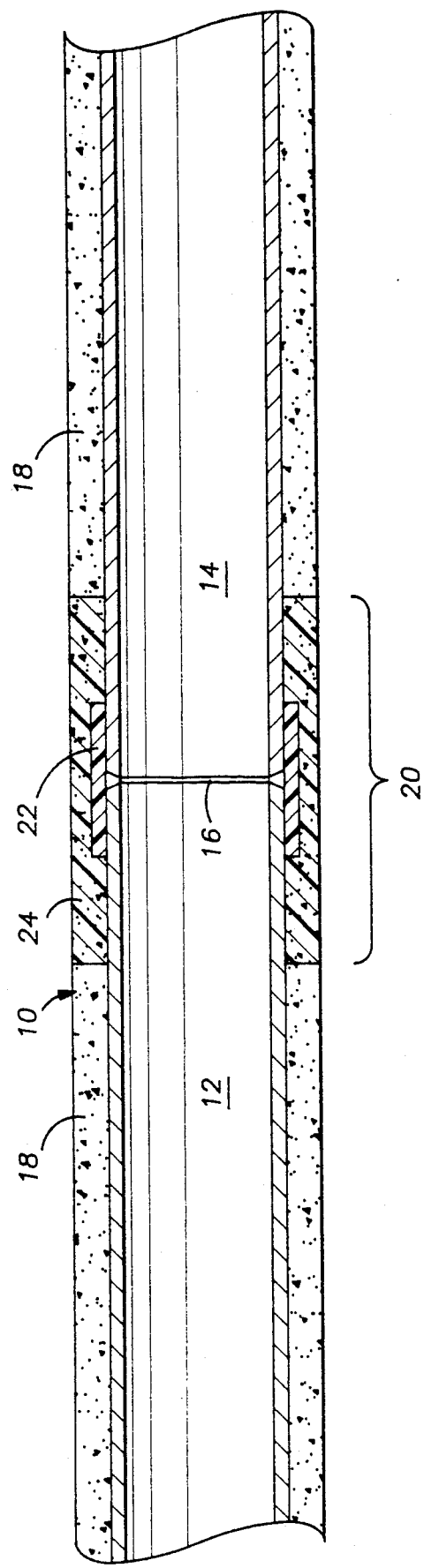
FIG. 1 of the drawing is a longitudinal sectional view of a portion of a pipeline showing one embodiment of the joint infill of this invention.

FIG. 1 of the drawing shows a segment of a pipeline 10 including sequential pipe joints 12, 14 welded together at 16. Each pipe length is covered with a concrete coating 18 which terminates short of the adjacent ends of the pipe lengths, leaving a gap 20. A shrink sleeve 22 covers the weld and extends axially along each pipe length for several inches. The shrink sleeve is usually made of an extruded heat shrinkable plastic sheet or tape which is wrapped around the pipe to completely cover the area which is not protected by the corrosion resistant coating which has previously been applied to the pipe. Heat is then applied to shrink the sleeve to cause it to fit tightly around this area. The gap is then filled by the joint infill 24 of this invention.

Figure 2:
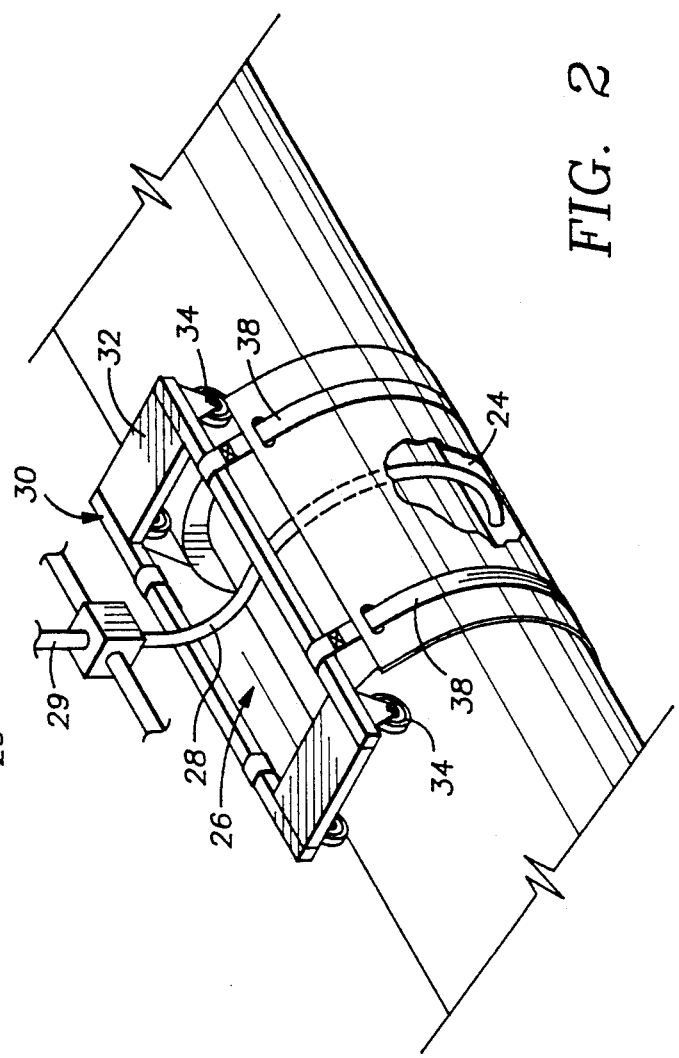
FIG. 2 is a perspective view of a portion of the pipeline showing a mold in place for forming the joint infill according to one embodiment of this invention.

As shown in FIG. 2, the filling of the gap is accomplished by installing a mold around the gap. If a solid polymer is to be used, the mold may consist of a sheet 24 of polyethylene, polypropylene or other material to which the polymer to be cast will not adhere, wrapped around the pipe with an opening 26 at the top through which the filler material and the polymer components can be placed into the mold space. The mold may be supported by a mold support cart 30 consisting of a rectilinear frame 32 mounted on wheels which support the cart on the concrete coating of the pipe. Straps 38 are attached to the longitudinal members 36 of the frame and wrap around the mold sheet 24 at each end to hold the mold sheet tightly against the concrete coating. Means not shown may be used to tighten the straps, and the straps preferably are readily releasable at one end. A filler tube 28 is inserted through the frame and the opening 26 at the top of the mold sheet. Once the mold is in place, the gap 20 between the ends of the concrete coating is filled with a granular or particulate filler material, and unreacted polymer is fed into the mold space through the tube 28. As the polymer fills the mold, the tube is gradually withdrawn so that it will not be held in the mold by the hardening polymer. When the polymer reaches the top of the mold, it is smoothed out by hand to form a continuous cylindrical surface.

FIG. 2 also shows a schematic drawing of a mixing valve for providing a mixture of polymer components to the mold. The valve 50 includes an inlet 52 for one of the components, an inlet 54 for the other component, an air inlet 56 and an outlet 58. The valve is suspended with the outlet 58 above the mold. The fill tube 28 extends from the outlet 58 through the opening in the top of the mold down to the bottom of the mold space when the molding operation begins.

The preferred polymers of this invention are fast setting, i.e. they will set up in five minutes or less sufficient for the mold to be removed. The mold is removed by loosening the straps 38 and rolling the cart longitudinally of the pipeline to the next joint to be filled.

Figure 3:
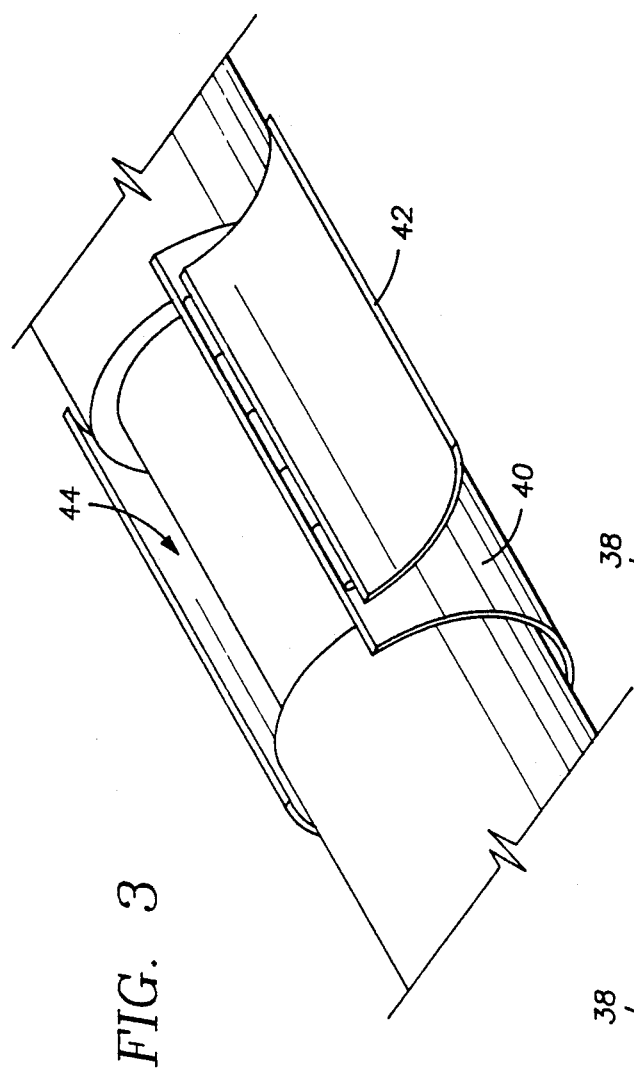
FIG. 3 shows a mold according to another embodiment of the invention.
Figure 4:
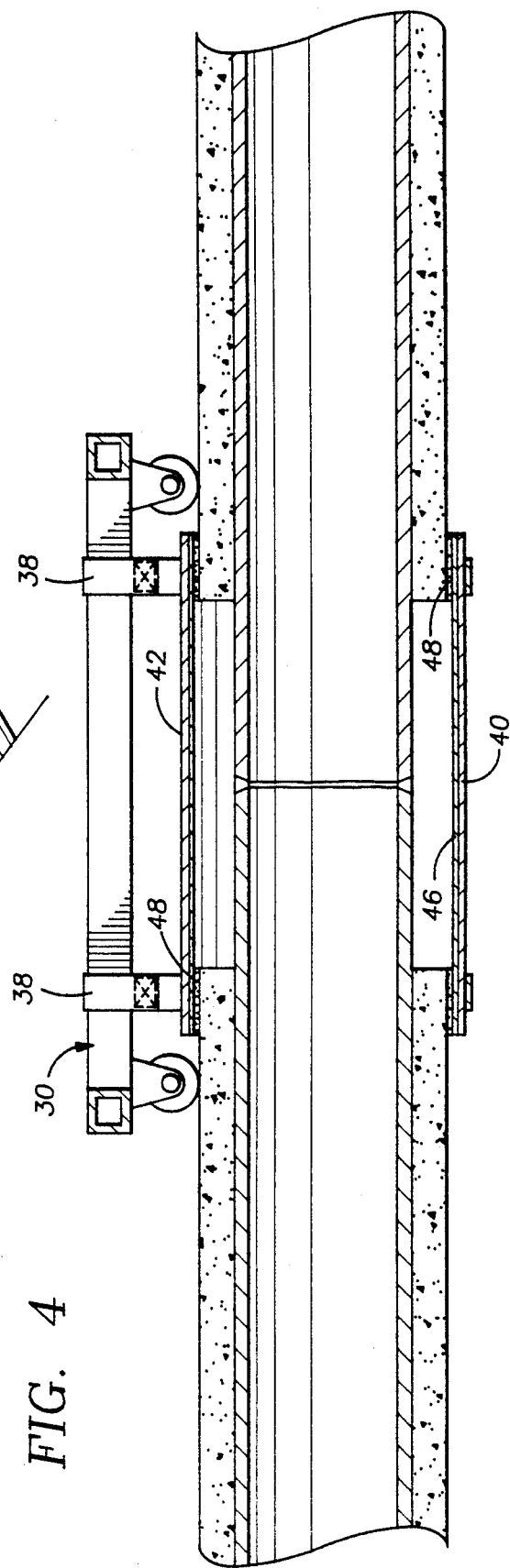
FIG. 4 is a vertical sectional view of a mold mounted to mold the joint infill according to one embodiment of the invention.

If a foamed product is to be produced, a steel mold is preferred. As shown in FIG. 3, such a mold may consist of a sheet steel cylinder 40 with an arcuate closure segment 42 hinged to it so that it may be opened to fill the mold. The partial cylinder 40 is placed around the pipe by sliding it on one end, or it may be made of a material resilient enough that it may be opened up to allow it to be placed around the pipe. Alternatively, the partial cylinder may be made in two halves, hinged together by a longitudinally extending hinge. In either case, it is positioned to enclose the gap to be filled, with the ends of the cylinder covering the ends of the concrete coating 18 on each joint of pipe, thereby enclosing an annular mold space 44 within the mold and surrounding the pipe between the ends of the concrete coating. A membrane 46, as shown in FIG. 4, lines the steel mold and protects it from contact by the polymer. The membrane is clamped between the ends of the mold and the ends of the concrete coating by the straps 38 at each end of the mold. Preferably a gasket or seal 48 is interposed between the mold ends and the concrete coating to prevent the liquid polymer components from leaking out when the mold is filled. The gasket may comprise an adhesive tape with adhesive on one side or both sides. The entire assembly is then supported on a cart 30 with the straps 38 as in the previous embodiment.

As in the previous embodiment, a filling tube 28 is placed into the mold space, extending substantially to the bottom, and the mold space is then filled with the filler material. The foaming polymer material is then placed into the mold through the tube 28, with the tube being withdrawn as the mold is filled. When the mold is filled with a predetermined amount of the polymer material, the segment 42 is placed over the gap in the partial cylinder 40, and clamped down to close the mold. The polymer foams and sets up enclosed in the mold. After five minutes or less, the straps 38 may be loosened, the mold segment 42 may be opened, and the mold may be removed from the molded joint infill. The membrane may adhere to the joint infill, but the mold parts are protected from such adherence.

The joint infill material of this invention is preferably made of a fast setting elastomeric polymer which will set up in a few minutes so that the pipe can be handled without fear of damage to the joint infill. Preferred polymers include the rapid setting solid polyurethanes, as for example those prepared by the reaction of the polyhydroxyl containing compounds and the organic polyisocyanates described in U.S. Pat. Nos. 3,983,064, 4,154,716 and 4,246,363, the disclosures of which are incorporated herein by reference. Other suitable polymers include the rapid setting polyureas, for example those prepared by the reaction of amine terminated polyethers and the organic polyisocyanates described in U.S. Pat. No. 4,474,900.

The polymers of this invention also preferably include a filler material or aggregate, for the purpose of adjusting the weight of the infill, and also to reduce the amount of expensive polymer required. Suitable aggregates include gravel or iron ore, of from 1/16 inch to one inch mesh, preferably ⅛ inch to ½ inch, chopped-up tires, wood chips, or any other available particulate solid material which will not pack solid of its own weight.

The compositions of this invention preferably also include a liquid modifier, such as those described in the aforesaid patents. In addition, the compositions preferably include a liquid organic carbonate, and a sufficient amount of one or more catalysts to insure that the composition will set up in not more than about five minutes.

The reactants to produce these polymers have a low viscosity, not greater than about 100 centipoises, before polymerization, so that when they are fed into a mold to form the joint infill, they will substantially completely fill the interstices between the granular filler materials.

In preparing the preferred polyurethanes, preferably an amine initiated polyol is used and more preferably a polyol is selected which has a hydroxyl number in the range of about 600 to about 900 and a minimum functionality of 4. One such material which can be obtained from Dow Chemical Company at Freeport, Tex. is sold under the trademark Voranol 800 and is the product of reacting ethylene diamine with 3 parts of propylene oxide and one part of ethylene oxide.

For the rapid setting polyureas, it is preferable to use an amine terminated polyether which has an equivalent weight in the range of 50 to 100 and a minimum functionality of 3.0. One such material which can be obtained from Texaco Chemical Co. is sold under the trademark JEFFAMINE T-403 and is fully described in U.S. Pat. No. 4,474,900.

The polymeric isocyanate used is preferably one which has a high vapor pressure for safety purposes. Dow Chemical Company sells a suitable material under the trademark PAPI 27 which is a crude polymeric isocyanate containing some methylene bis phenyl isocyanate and 50–60% polyethylene polyphenyl isocyanate.

The liquid modifier used is preferably a heavy aromatic petroleum distillate consisting primarily of C9 to C11 aromatic hydrocarbons, having a flash point of at least about 200° F. to 230° F. Such a product is available from Arco Chemical Company division of Atlantic Richfield Company under the designation H.A.S. (heavy aromatic solvent).

The liquid organic carbonate used may be one of those described in U.S. Pat. No. 4,154,716. Propylene carbonate has been found to give good results. The organic carbonates are known as plasticizers, and in the composition of this invention they reduce the propensity of the composition to shrink as it cures, and therefore reduce the tendency of the product to crack under stresses produced during curing. Other plasticizers which have been tried do not produce this advantageous result.

In a particularly preferred embodiment of the invention, a foamed polyurethane or polyurea is used. Foaming extends the range of densities which can be obtained, and allows a greater reduction in the amount of polymer required, without reducing the strength or impact resistance of the infill to an undesirable extent. Thus, with sufficient foaming, the density of the material may be reduced to one-third its unfoamed density of about 66 lbs. per cubic foot, requiring only one-third as much polymer. If weight is important, the density can be increased by adding a heavy aggregate, such as iron ore, to increase the density to as much as 120 lbs. per cubic foot. When a foamed material is used, the volume of the space to be filled is calculated, taking into account the space occupied by the filler material, and an amount of polymer components is introduced into the mold which will produce the desired density of foamed material when it foams to fill the mold.

The foamed polyurethanes of this invention are prepared similarly as the unfoamed polyurethanes, except that a foaming material is added. Water is a suitable foaming material, as well as various other low-boiling point materials which will boil at the reaction temperature.

The reactants for preparing the compositions of the invention are preferably prepared as two components. Component A consists of the polymeric isocyanate combined with the liquid modifier and a liquid organic carbonate. Component B consists of the polyhydroxyl compound or polyether combined with the liquid modifier and a small percentage of the liquid organic carbonate, together with an amount of catalyst sufficient to insure that the composition will set up in no more than about five minutes.

The catalyst used for polyurethanes may be any of the well known catalysts for polyurethane. A number of such catalysts are described in U.S. Pat. No. 4,246,363. The preferred catalysts for the polyurethane composition of this invention are approximately 0.1% to about 0.5% of a 1-2 mixture of triethylene diamine and dipropylene glycol together with about 0.01% to about 0.04% of an alkyl tin mercaptide such as that sold by Witco Chemical Company as their UL-22 catalyst.

When the foamed product is to be produced, a small amount of water, from about 0.1% to about 4.0%, and preferably in the range of about 1.8% to about 2.8%, is added to Component B. The amount of water used will be varied depending on the desired density of the final product.

The ingredients of Components A and B are mixed separately and held at essentially ambient temperature until ready for use, although they should be protected from extreme cold or extreme heat, because temperature affects the speed of reaction. In use, the two components are mixed as they are pumped into the mold where the product of the invention is to be made, as previously described.

When the mold has been put in place, it is filled with the particulate filler material and the two components A and B are then pumped through the conduits 52 and 54, and mixed within the valve 50, and the mixture flows into the bottom of the mold through the tube 28. This mixture has a very low viscosity, usually not greater than about 100 centipoises, so that it flows readily into the mold space and between the interstices between the particles of the filler material. When the mold is filled to the desired extent, the valve may then be cleaned out by blowing air through the conduit 56 in order to prevent the material from solidifying within the valve and the conduits. A check valve 59 prevents the liquid components from entering the air inlet conduit 56.

After the mold is filled, the composition will set in a very short time, preferably not over about 5 minutes, and the mold sheets can then be removed. If a steel mold with a membrane mold protector has been used, the mold comes off easily. A polyethylene or polypropylene membrane will also come off easily, since these materials do not adhere to the polyurethane or polyurea. If a cardboard membrane has been used, it will adhere to the infill material.

As previously noted, with a steel mold, means must be provided to prevent the polymer from adhering to the mold. In the past, a release agent, such as wax or oil, has been used for this purpose. However, such release agents are undesirable for underwater installations, because the wax or oil causes pollution of the water. Preferably, a membrane is used to line the mold and prevent the polymer from contacting the mold. Such membranes may be made of a sheet material such as polyethylene or polypropylene, and may be from about 0.003 inch to 0.250 inch or more thick. Preferably, however, the membrane consists of fibers, shreds or a mesh of natural or synthetic materials, woven or adhered together to form a pad, sheet or cloth which can be stacked or rolled for storage. Binders and/or adhesives may be used to enhance the structure of the membrane.

The material used for the membrane may be prepared from natural materials, such as mineral fiber, cotton, wool or silk, or from natural materials which have been processed, such as cellulosic based products such as those used to form paper or cardboard, or mixtures of such materials. The cellulosic materials may include wood, or wood by-products, hydroxyethylcellulose, carboxymethylcellulose or hydroxyalkylcelluloses, or mixtures of such materials. Suitable membrane fibers, shreds, or meshes may also be prepared from synthetic materials, such as polyesters, polyurethanes, nylon, rayon, acetates, polyamides, polyacrylonitriles, polyvinyl alcohol or polyolefins. Inorganic materials, such as glass, may also be used, as in glass fibers or a mesh of glass fibers. Combinations of natural, synthetic and inorganic fibers materials may be used with or without special surface treatments. Also, reclaimed or recycled materials can be used as a material base for the membrane of this invention.

A preferred material for the membrane of this invention is cardboard, including corrugated paperboard. Such materials may be used in thicknesses of from about 0.005 inch to one inch, but preferably are in the range of 0.015 inch to 0.5 inch, and more preferably are from about $\frac{1}{8}$ inch to about $\frac{1}{4}$ inch. The cardboard provides a barrier between the fast cure material and the mold surface, preventing the fast cure material from contacting the mold surface and adhering to it, so the mold surface is reusable. Instead, the cardboard adheres to the fast cure material. A properly formulated fast cure material saturates a portion of the cardboard, but does not penetrate it, providing a composite skin to the resultant cutback fill which improves the ability of the joint infill to withstand various physical abuses which result from insertion of the pipe into the water or ground. These physical abuses vary from rollers on a stinger assembly to land and underwater projections which the pipe may encounter as it is dragged off-shore and/or settles on the land surface or subsea surface. Moreover, the cardboard does not provide a marine hazard to fish nets, for example, and a biodegradable cardboard can be used for environmental purposes.

The use of a cardboard membrane also makes it practical to use joint infill materials which exhibit slow surface cure; that is, have a surface which remains tacky or sticky for a long period. The membrane of the invention negates the slow surface cure problem as the reaction material is no longer in contact with the mold surface or any other surface (i.e., wheels, rollers, slide rails) to which the slow cure surface would stick. The membrane adheres to the surface of the slow cure material which isolates and prevents the slow cure material from adhering to other surfaces.

Some membrane materials may also provide a gasket between the interior surface of the mold and the exterior surface of the concrete weight coating, thereby eliminating the necessity for a seal for reducing or preventing leakage of the liquid fast cure, medium cure or slow cure components prior to solidification.

EXAMPLE 1

In preparing a solid polyurethane according to this invention, component A is prepared by mixing 60 pounds of a polyisocyanate sold under the trademark PAPI 27 by Dow Chemical Company, 30 pounds of Shell Chemical Company's SC-150 Solvent, and 10 pounds of propylene carbonate. Component B is prepared by mixing 31 pounds of Dow Chemical Company's Voranol 800, 64 pounds of the SC-150 Solvent, 5 pounds of propylene carbonate, 0.08 pounds of a catalyst consisting of $\frac{1}{3}$ triethylenediamine and $\frac{2}{3}$ dipropylene glycol, and 0.002 pounds of an alkyl tin mercaptide sold by Witco Chemical Company under the designation UL-22 catalyst. The two components are kept separate from each other until they are to be used, and are kept at atmospheric temperature.

When the product is to be molded, separate pumps are used to pump the components into a mixing valve, where they are mixed together and then fed into a mold made of polyethylene sheet, until the mold is filled. After a wait of five minutes, the mold is removed, leaving a solid joint infill which is highly resistant to injury from sharp blows. The joint infill is also securely adhered to the pipe and to the adjacent ends of the concrete coating.

EXAMPLE 2

In preparing a solid polyurea according to this invention Component A is preparing by mixing 64 pounds of the PAPI 27 polyisocyanate, 26 pounds of SCI50 solvent, and 10 pounds of propylene carbonate. Component B is prepared by mixing 31 pounds of JEFFAMINE T-403, 64 pounds of the SC150 solvent, 5 pounds of propylene carbonate, 0.08 pound of catalyst consisting of $\frac{1}{3}$ triethylenediamine and $\frac{2}{3}$ dipropylene glycol, and 0.002 pound of Witco's UL-22 catalyst. The components are handled the same way as in Example 1, producing a fast-setting polyurea. Five minutes after pouring into the mold, the mold is removed, resulting in a solid joint infill which is highly resistant to injury by sharp blows.

EXAMPLE 3

In preparation of a foamed joint infill, Component A was prepared by admixing 92 pounds of Dow's PAPI 27 polymeric isocyanate with 8 pounds of Arco's H.A.S. solvent. Component B is prepared by mixing 27 pounds of Dow's Voranol 800, 61.3 pounds of the H.A.S. solvent, 6.4 pounds of ethoxylated nonyl phenol, 0.3 pound of a 1:2 mixture of triethylenediamine and dipropylene glycol, 2.5 pounds of Union Carbide's L-5420 silicone surfactant, 0.023 pound of Witco's UL-22 alkyl tin mercaptide catalyst and 2.45 pounds of water.

Two joints of 24" diameter pipe having a 3 inch thick concrete coating were welded together, leaving a 24 inch distance of bare pipe between the ends of the concrete coatings. The bare pipe was coated with hot melt epoxy, and a polyethylene shrink sleeve was installed around the weld. A removable steel mold was fitted with a sheet of cardboard membrane (⅛" thick) on the inside surface of the mold and the mold with the cardboard membrane wrapped around the gap between the ends of the concrete coating. The mold and cardboard membrane was 30 inches long and overlapped the concrete on each end by 3 inches. The mold was tightened around the overlapped concrete with straps and locked with quick release buckles. The top of the mold was fitted with a hinged closure to allow for entrance of a mold fill material.

The mold space is filled with a ¼ inch pea gravel aggregate, the volume of the remaining mold space is calculated, taking into account the volume occupied by the pea gravel, and equal volumes of Compounds A and B are measured out, sufficient to total one-third the volume of the mold space. The separate components are fed in equal volumes through a blending valve and through a tube inserted into the bottom of the mold. The opening in the top of the mold is covered by a cardboard membrane, and the closure is closed and clamped shut. The polyol resin blend and isocyanate reacted and formed an open cell, polyurethane polymer foam which filled the cutback void. The resultant polyurethane foam adhered to the pipe, concrete edges and the cardboard membrane but not to the mold surface. The mold was removed 2½ minutes after injection of the polyurethane fast cure material. Upon mold removal, the mold fell free of the fast cure polyurethane foam and cardboard membrane with the cardboard adhered to the surface of the polyurethane foam, providing improved exterior protection to the resultant joint. The mold was found to be clean and free of any polyurethane foam fast cure material which rendered the mold reusable.

This invention is not limited to the specific embodiments shown and described, but instead includes all variations included within the scope of the following claims.

We claim:

1. A method for forming a joint infill at the juncture of sequential lengths of concrete coated pipe welded together end to end with a gap between the concrete coatings which comprises
   enclosing the gap with a mold having a top opening,
   filling the mold with a particulate filler material,
   then injecting into the mold a mixture of unreacted liquid components of a rapid setting elastomeric polymer,
   allowing the components of the polymer to react until the polymer sets up, and
   removing the mold.

2. A method as defined by claim 1 wherein the elastomeric polymer is a foamed material.

3. A method as defined by claim 1 and including lining the mold with a membrane before filling with the particulate material.

4. A method as defined by claim 3 in which the membrane is made of cardboard.

5. A method as defined by claim 1 in which the mold is made of a material to which the polymer will not adhere.

6. A method as defined by claim 2 in which the mold is made of steel and includes a closure which is held closed while the polymeric components react.

7. A method as defined by claim 1 including inserting a filler tube substantially to the bottom of the space enclosed by the mold before introducing the particulate material, and withdrawing the filler tube during the injection of the polymer components into the mold space, where by the mold is filled with the polymer components from the bottom up and the filler tube is removed before the polymer sets up.

* * * * *